United States Patent Office 3,751,431
Patented Aug. 7, 1973

3,751,431
F.E.S. DERIVATIVES
Herbert L. Wehrmeister and Edward B. Hodge, Terre Haute, Ind., assignors to Commercial Solvents Corporation
No Drawing. Filed Feb. 16, 1970, Ser. No. 11,880
Int. Cl. C07d 9/00
U.S. Cl. 260—343.2 F          6 Claims

ABSTRACT OF THE DISCLOSURE

New compounds are provided and have the formula

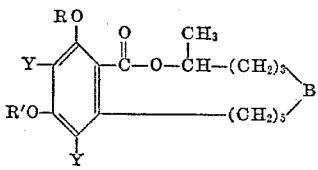

where B is $>C=O$, $>CHOH$ or $>CH_2$; R and R' can be hydrogen, alkyl, acyl or aralkyl radicals; and Y is bromine. These compounds exhibit antibacterial activity and can be used in animal feed compositions.

---

The present invention relates to new compounds and an object of the present invention is to provide compounds which exhibit antibacterial activity or aid in increasing the rate of growth in meat-producing animals, e.g., cattle, lamb and swine.

The compounds of this invention are illustrated by the general formula:

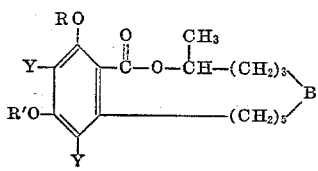

where B is $>C=O$, $>CHOH$ or $>CH_2$; R and R' are hydrogen, substituted or unsubstituted alkyl radicals, e.g., lower alkyl such as methyl, ethyl, hexyl, etc., lower saturated acyclic acyl radicals such as acetyl, or aralkyl, e.g., benzyl or bromobenzyl radicals; and Y is bromine. Compounds having the above formula where B is $>CHOR$ where R has the same meaning given above are also contemplated by the present invention.

The compounds can be administered to animals by any suitable method including oral and parenteral administrations. For example, the compounds can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be used to control, e.g. inhibit, cell growth of noxious bacteria.

The compounds of the present invention can be used to control, e.g. inhibit, cell growth of noxious bacteria. They can be incorporated in ointments, for instance, for superfical application to control bacteria, e.g. *Staphyloccus aureus*; *Streptoccus faecalis*; *Streptococcus hemolytirus*; and *Shigella dysenteriae*. One suitable ointment is a water-soluble polyethylene glycol ointment base composed of 40 parts by weight of Polyethylene Glycol 4000 and 60 parts by weight of Polyethylene Glycol 400 containing 1.5 parts by weight of a compound of the present invention.

The compounds of this invention can be prepared from dihydro F.E.S. compounds (B in the general formula is $>C=O$), deoxy F.E.S. compounds (B is $>CH_2$) and tetrahydro F.E.S. compounds (B is $>CHOH$). The dihydro F.E.S. compounds are described in U.S. Pat. No. 3,239,354; the deoxy F.E.S. compounds are described in U.S. Pat. No. 3,239,341; and the tetrahydro F.E.S. compounds are described in U.S. Pat. No. 3,239,345; all of these patents herein incorporated by reference.

The compounds of the present invention can be prepared by reacting the given dihydro-, deoxy- or tetrahydro-F.E.S. compound with a bromine solution at ambient temperatures, generally from about 15 to 35° C., and the resulting product mixture is recovered and purified by crystallization. About a 2 to 1 mole ratio of bromine to the F.E.S. compound is preferably used.

The following examples will serve to illustrate the invention.

EXAMPLE I

A F.E.S. compound of the above general formula wherein each of R and R' is hydrogen, B is $>CH_2$ and both Y's are hydrogen was used in this example. Five grams of this compound was dissolved in 250 ml. of chloroform and then 25 ml. of bromine solution (10 ml. of bromine per 40 ml. of chloroform) was added. The resultant mixture was stirred at room temperature in an open beaker and then the volatiles were evaporated off under a vacuum, leaving 8.30 grams of a solid residue. The residue was purified by recrystallization from n-hexane and there was obtained 2.46 grams of a solid product having a melting point range of 114–116° C. Analysis of the product by nuclear magnetic resonance confirmed that it had the following formula:

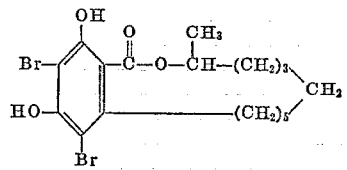

EXAMPLES II TO VIII

Essentially the same procedure used in Example I is followed using compounds of the general formula

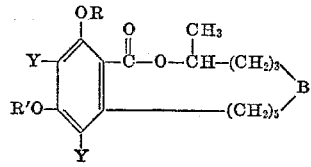

as starting compounds wherein the values for Y, B, R and R' are as set forth in Table A below for the respective examples. The products produced from these starting compounds also correspond in structure to the general formula, and the values for Y, B, R and R' of the products are set forth in Table B. As noted above, the starting compounds can be produced according to methods described in issued U.S. patents.

TABLE A.—STARTING COMPOUNDS

| Example | B | R | R' | Y |
|---|---|---|---|---|
| II | >CH$_2$ | —CH$_3$ | —CH$_3$ | H |
| III | >CH$_2$ | —CH$_2$CH$_3$ | —CH$_2$CH$_3$ | H |
| IV | >CH$_2$ | O‖—C—CH$_3$ | —CH$_3$ | H |
| V | >CHOH | H | H | H |
| VI | >C=O | H | H | H |
| VII | >CHOH | —CH$_3$ | —CH$_3$ | H |
| VIII | >C=O | H | Benzyl | H |

TABLE B.—PRODUCT PRODUCED

| Example | B | R | R' | Y |
|---|---|---|---|---|
| II | >CH$_2$ | —CH$_3$ | —CH$_3$ | Br |
| III | >CH$_2$ | —CH$_2$CH$_3$ | —CH$_2$CH$_3$ | Br |
| IV | >CH$_2$ | O‖—C—CH$_3$ | —CH$_3$ | Br |
| V | >CHOH | H | H | Br |
| VI | >C=O | H | H | Br |
| VII | >CHOH | —CH$_3$ | —CH$_3$ | Br |
| VIII | >C=O | H | Benzyl | Br |

EXAMPLES IX–XVI

In each of these examples, six head of cattle are fed a daily ration of alfalfa hay and ground corn cobs containing from 5 to 20 ounces of each of the compounds of the present invention, produced in each of the above Examples I to VIII, per 100 pounds of feed and their rate of growth is improved.

The following are additional specific examples of animal feed compositions of this invention useful for increasing the rate of growth and feed efficiency of young animals to market weight.

EXAMPLES XVII TO XXIV

In each of the examples, young beef cattle, i.e., calves to yearlings running to two year olds, are given 5 to 20 milligrams per day per each animal of the compound produced in the example designated in Table C below, which compound is intimately admixed in about 18 to 22 pounds per head per day of a complete pelleted ration for about 180 days. The complete pelleted ration includes in addition to the compound of the example designated in Table C the following:

| | |
|---|---|
| Barley | 40 (—43%). |
| Molasses dried beet pulp | 34.5 (—37.5%). |
| Alfalfa pellets | 8.0%. |
| Tallow | 2.5%. |
| Calcium carbonate | .30%. |
| Urea | .30%. |
| Phosphorus source | .40%. |
| Salt | .50%. |
| Molasses | 10.00%. |
| Trace mineral | 0.5%. |
| Vitamin A | 2–4 MMIU/ton. |

NOTE.—Milo or corn, for example, can be substituted for the barley.

The compound of the given example is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

TABLE C

| Example: | Compound of this invention produced in the following example |
|---|---|
| XVII | I |
| XVIII | II |
| XIX | III |
| XX | IV |
| XXI | V |
| XXII | VI |
| XXIII | VII |
| XXIV | VIII |

EXAMPLE XXV

For young swine, i.e., six week old pigs to about 100 pound pigs, each animal is given 5 to 20 milligrams per day of the compound of Example I intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example I intimately admixed in about 5½ to 10 pounds per head per day of a finisher ration until it reaches market weight of about 220 pounds. The grower and finisher ration include in addition to the compound of Example I, the following:

| | Percent | |
|---|---|---|
| | Grower | Finisher |
| Ground yellow corn | 77 | 86.7 |
| Soybean meal (44% protein) | 16 | 6.5 |
| Meat and bone scraps (50% protein) | 2.5 | 2.5 |
| Dehydrated alfalfa meal (17%) | 2.5 | 2.5 |
| Steamed bone meal | 0.5 | 0.5 |
| Ground limestone | 0.5 | 0.3 |
| Iodized salt | 0.5 | 0.5 |
| Vitamin, antibiotic and trade mineral premix | 0.5 | 0.5 |

The compound of Example I is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

EXAMPLE XXVI

For 4 to 10 month old lambs weighing 50 to 70 pounds, each animal is given 1 to 15 milligrams per day of the compound of Example II, intimately admixed in about 3 to 6 pounds per head per day of a complete ration for 30 to 90 days. The complete ration includes in addition to the compound of Example II the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example II is admixed with the above ingredients in a blender in the following amounts in milligrams per pound to provide an appropriate complete feed with dosage levels ranging from 1 to 15 milligrams per head per day.

| Mg./pound | Mg./head/day |
|---|---|
| .5 | 2 |
| 1.0 | 4 |
| 1.5 | 6 |
| 2.0 | 8 |
| 2.5 | 10 |
| 3.75 | 15 |

EXAMPLE XXVII

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and above five pounds of feed during the next five weeks. During the course of this feeding schedule, each bird should receive a total of about 12 to 36 milligrams of the compound of Example I in the grower and finisher feed each of which includes in addition to the compound of Example I the following:

|  | Pounds | |
|---|---|---|
|  | Grower | Finisher |
| Ground yellow corn | 1,000 | 1,200 |
| Soybean meal (44% protein) | 700 | 500 |
| Fish meal (60% protein) | 100 | 80 |
| Alfalfa meal | 50 | 50 |
| Meat and bone scraps | 0 | 30 |
| Animal fat | 80 | 80 |
| Dicalcium phosphate | 35 | 40 |
| Iodized salt | 10 | 10 |
| Limestone | 15 | |
| Premix vitamins trade minerals and antibiotics | 10 | 10 |

It is claimed:
1.

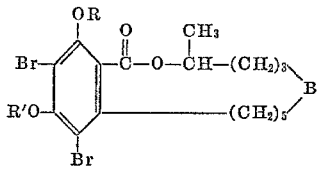

wherein B is a radical selected from the group consisting of $>C=O$, $>CHOH$ and $>CH_2$, and R and R' are selected from the group consisting of hydrogen, lower alkyl, lower alkanoyl, benzyl, and bromobenzyl.

2. A compound of claim 1 wherein R or R' is methyl.
3. A compound of claim 1 wherein at least one of R and R' is benzyl or bromobenzyl.
4. A compound of claim 1 where B is $>CH_2$.
5. A compound of claim 1 wherein each of R and R' is hydrogen.
6. A compound of claim 4 wherein each of R and R' is methyl.

References Cited
UNITED STATES PATENTS 3,503,994   3/1970   Hodge et al. _____ 260—343.2

JOHN M. FORD, Primary Examiner

U.S. Cl. X.R.
424—279; 99—2 G